Oct. 24, 1933.  G. W. ALLEN  1,932,126
MOUNTING FOR TUBULAR HANDLES
Filed May 19, 1930
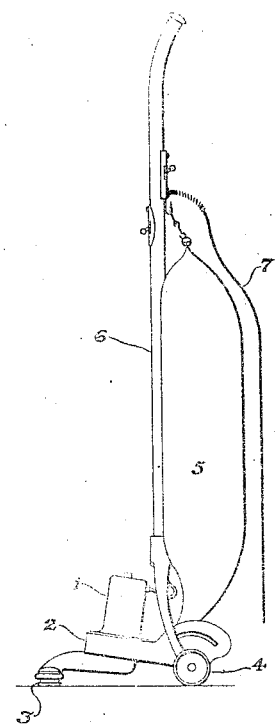
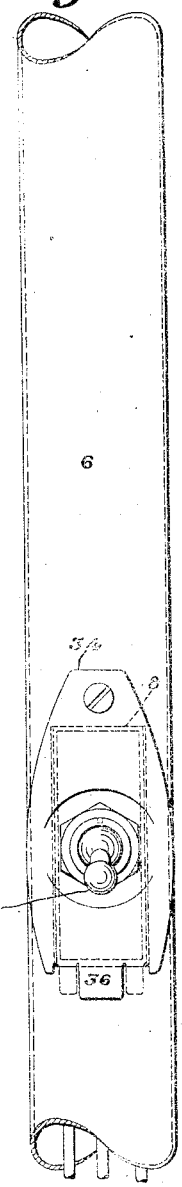
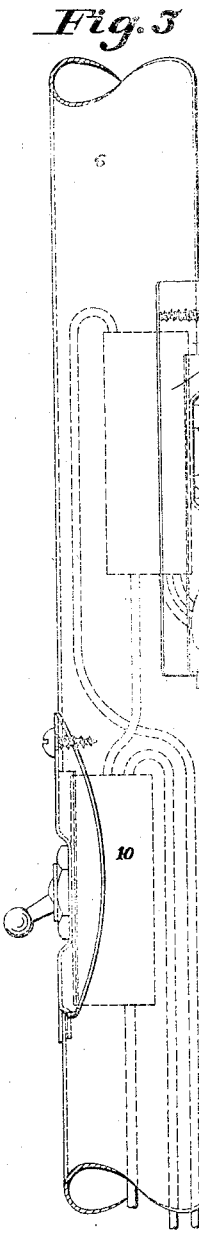
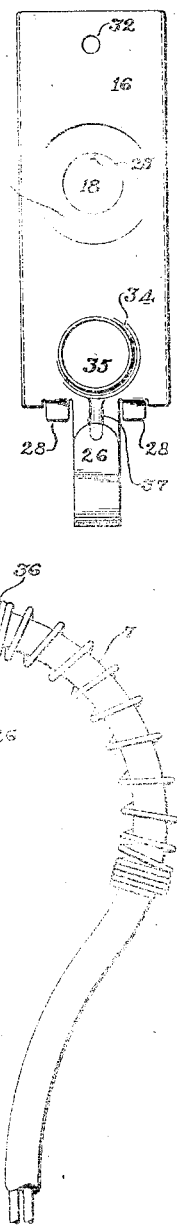
Witness
Paul F. Bryant
Inventor
George W. Allen Patented Oct. 24, 1933

1,932,126

UNITED STATES PATENT OFFICE 1,932,126

MOUNTING FOR TUBULAR HANDLES

George W. Allen, Boston, Mass., assignor to B. F. Sturtevant Company, Hyde Park, Mass., a corporation of Massachusetts Application May 19, 1930. Serial No. 453,843

3 Claims. (Cl. 247—13)

The present invention relates to tubular handles, and more particularly to a mounting or plate for the same whereby a switch or other device may be secured within or upon such a handle in an efficient, simple, and inexpensive manner.

In the accompanying drawing the invention is illustrated as applied to the tubular handle of a household vacuum cleaner having a switch for making and breaking the electrical circuit, hereinafter referred to as the main switch, and also having a switch for varying the speed of the motor. Fig. 1 is a side elevation of a well-known type of household vacuum cleaner having the invention incorporated therein; Fig. 2 is a front view of a portion of the handle showing the speed switch and its supporting plate; Fig. 3 is a side view of a portion of the handle showing both switches; and Fig. 4 is a front view of the plate which supports the main switch.

The cleaner illustrated in Fig. 1 comprises the usual motor 1, fan casing 2, suction nozzle 3, supporting wheels 4, dust bag 5, propeller handle 6, and flexible electric cord 7 for attachment to some convenient source of electric current.

The handle 6, as shown in Figs. 2 and 3, is in the form of a cylindrical, metal tube, and has formed or cut a rectangular opening 8 in its front wall for the reception of the speed switch 10, and a similar but somewhat larger opening in its rear wall for the main switch 14.

The plate or mounting for supporting the main switch is indicated at 16, and is preferably pressed out of sheet metal, being made arcuate in shape to fit the tubular handle 6. In order to facilitate the mounting of the switch mechanism on the plate, the latter is provided with a depressed central flat portion 17 having the hole 18 through which passes the hollow stud 20 threaded on its outer surface to receive the clamping nut 22 which rigidly secures the switch structure to its supporting plate 16, a projection or key 23 at the top of the hole 18 entering a groove or key way in the stud 20 and preventing the turning of the latter when the clamping nut is tightened.

The means for securing the lower end of the plate 16 to the handle comprise the bag-supporting hook 26 with its shank 27 positioned to overlie the outer surface of the handle 6 at the lower extremity of the opening, and the downwardly offset lugs or fingers 28 to underlie the inner surface of the handle. Thus the lower extremity of plate 16 grips the wall of the handle on both inside and outside and holds the end of the plate securely in position.

The upper end of the plate is fixed to the handle by the sheet metal screw 30 which passes through the hole 32 formed near the top margin of the plate 16 and through the metal wall of the handle, a small hole first being formed in the handle to start the screw which will then cut its own thread. A lock washer is provided beneath the head of the screw to prevent loosening.

The method of assembling the plate 16 with its switch 14 in position on or in the handle is as follows: The handle and the switch having first been wired, the switch is secured to the plate or mounting by means of the clamping nut 22. The switch body is next passed through the opening in the handle into the interior thereof and the plate brought against the handle. The switch and its supporting plate are then moved bodily upward until the lugs or fingers 28 clear the lower edge of the opening. The lower end of the plate is now pushed inwardly and then the plate and attached switch are moved downward to bring the fingers 28 beneath the wall of the handle, the shank 27 of the hook passing above the same thus securing the lower end of the plate in the desired position. The upper end of the plate 16 is then attached to the handle by means of the sheet metal screw 30.

In addition to the bag-supporting hook 26 which is formed integrally with the plate or mounting 16 for the main switch, an annular projection or lip 34 is provided extending outwardly from the lower portion of the plate and surrounding an opening 35 therein. The flexible electric cord enters the handle through this opening, being supported by the encircling wire 36 the inner end of which is anchored beneath the longitudinal raised rib 37.

The plate 34 which supports the speed switch 14 is similar in construction to the plate 16 which supports the main switch. Instead, however, of the hook 26 it has a middle lug 36. It also lacks the hole and annular boss for the electric cord. The method of assembling both switches is the same.

Owing to the depression of the portion 17 of the handle, the body of the switch is offset somewhat as shown at 38 from the upper portion of the plate 16, thus permitting the upper end of the switch body to pass under the wall of the handle when the parts are pushed upwardly in the assembling operation.

The present invention affords a simple, inexpensive, and efficient method of mounting electrical switches or other attachments upon the tubular handles of vacuum cleaners or other apparatus. It is only necessary to cut the opening in the handle and bore one small hole. Since the plate covers the top and side margins of the opening, care need be taken in finishing only the bottom margin. But a single screw is required, yet the parts are held most securely in position. The plate is of a shape and construction that can be produced at a minimum of cost for material and labor, and assembling is easily and quickly accomplished.

Having thus described the invention, what is claimed is:

1. The combination with a handle having a tubular wall with an opening therein, said opening, at one of its ends, being shaped to have marginal edge portions angularly arranged with respect to each other, of a plate having a cylindrical contour to conform to the handle, the plate having side portions extending beyond the edges of the opening and lying closely against the exterior of the tubular wall, an inwardly bent lug at one end of the plate to be inserted into the opening to engage the interior of the wall to prevent outward movement of the end of the plate and to engage in the angle formed by said edge portions to prevent lateral displacement, and detachable means passing through the other end of the plate and the wall to secure said end to the handle.

2. The combination with a handle having a tubular wall with an opening therein, said opening, at one of its ends, being shaped to have marginal edge portions angularly arranged with respect to each other of a plate having a cylindrical contour to conform to the handle, the plate having side portions extending beyond the edges of the opening and lying closely against the exterior of the tubular wall, the plate having lugs at one end to engage respectively the inner and outer surfaces of said wall, the lug which engages the inner surface of the wall also engaging in the angle formed by said edge portions to prevent lateral displacement of the plate and means passing through the other end of the plate and the wall to secure said end to the handle.

3. The combination with a handle having a tubular wall with an opening therein, of a plate having a cylindrical contour to conform to the handle, the plate having side portions extending beyond the edges of the opening and lying closely against the exterior of the tubular wall, the plate having lugs at one end to engage respectively the inner and outer surfaces of said wall, the exterior lug being downwardly extended and upwardly curved to form a supporting hook, and means passing through the other end of the plate and the wall to secure said end to the handle.

GEORGE W. ALLEN.